(12) United States Patent
Boyd

(10) Patent No.: US 6,340,167 B1
(45) Date of Patent: Jan. 22, 2002

(54) ANTI-JACKKNIFE TRAILER COUPLING

(76) Inventor: Joseph J. Boyd, 103 Timberland Rd., Cumming, GA (US) 30040

( * ) Notice: Subject to any disclaimer, the term of this patent is extended or adjusted under 35 U.S.C. 154(b) by 0 days.

(21) Appl. No.: 09/544,747

(22) Filed: Apr. 7, 2000

(51) Int. Cl.⁷ .................................................. B62D 53/06
(52) U.S. Cl. .................................... 280/432; 280/474
(58) Field of Search ................................ 280/432, 433, 280/435, 436, 437, 438.1, 439, 441.1, 474

(56) References Cited

U.S. PATENT DOCUMENTS

| | | | |
|---|---|---|---|
| 2,213,221 A | * 9/1940 | Johnson | 280/432 |
| 3,751,070 A | * 8/1973 | Schaffart et al. | 280/432 |
| 3,774,941 A | * 11/1973 | Durr | 280/432 |
| 3,850,449 A | * 11/1974 | Link et al. | 280/432 |
| 3,874,699 A | * 4/1975 | Hayes et al. | 280/432 |
| 3,909,044 A | * 9/1975 | Henzel et al. | 280/432 |
| 3,985,369 A | * 10/1976 | O'Leary | 280/432 |
| 4,065,149 A | * 12/1977 | Roth | 280/432 |
| 4,300,785 A | * 11/1981 | Mettetal | 280/432 |
| 4,405,146 A | * 9/1983 | Mitchell | 280/432 |
| 4,452,466 A | * 6/1984 | Herbert | 280/432 |
| 4,720,118 A | * 1/1988 | Schultz et al. | 280/432 |
| 4,826,198 A | * 5/1989 | Herbert | 280/432 |
| 5,224,727 A | * 7/1993 | Ramskugler | 280/432 |
| 5,259,640 A | * 11/1993 | Mackey | 428/432 |
| 5,690,347 A | * 11/1997 | Juergens et al. | 280/432 |

* cited by examiner

Primary Examiner—Kevin Hurley
(74) Attorney, Agent, or Firm—Todd Deveau; Ryan A. Schneider; Troutman Sanders LLP

(57) ABSTRACT

This invention is a trailer-tractor rig coupling that prevents jackknifing. It performs like a standard coupling in all normal cases, but if on icy roads, the semi slips and turns opposite to the steering wheel, the coupling brake locks the semi to the tractor. Then when the semi responds to the front wheels again, the brake releases and operates in a normal way.

16 Claims, 6 Drawing Sheets

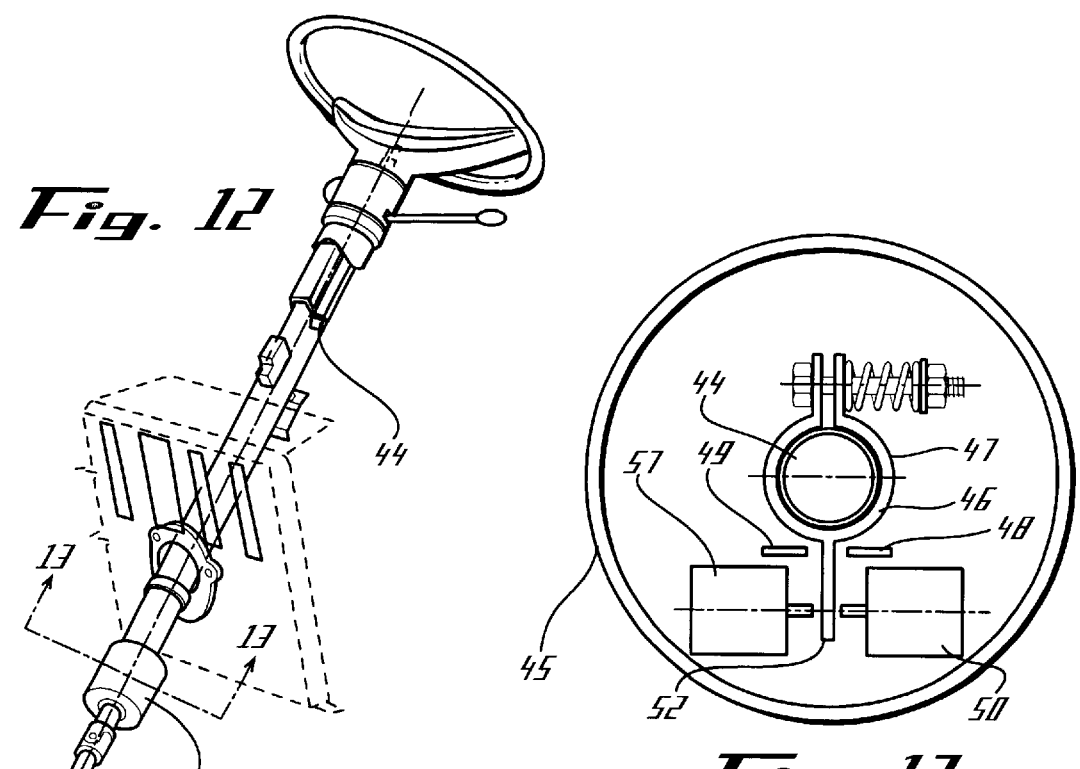
Fig. 12
Fig. 13
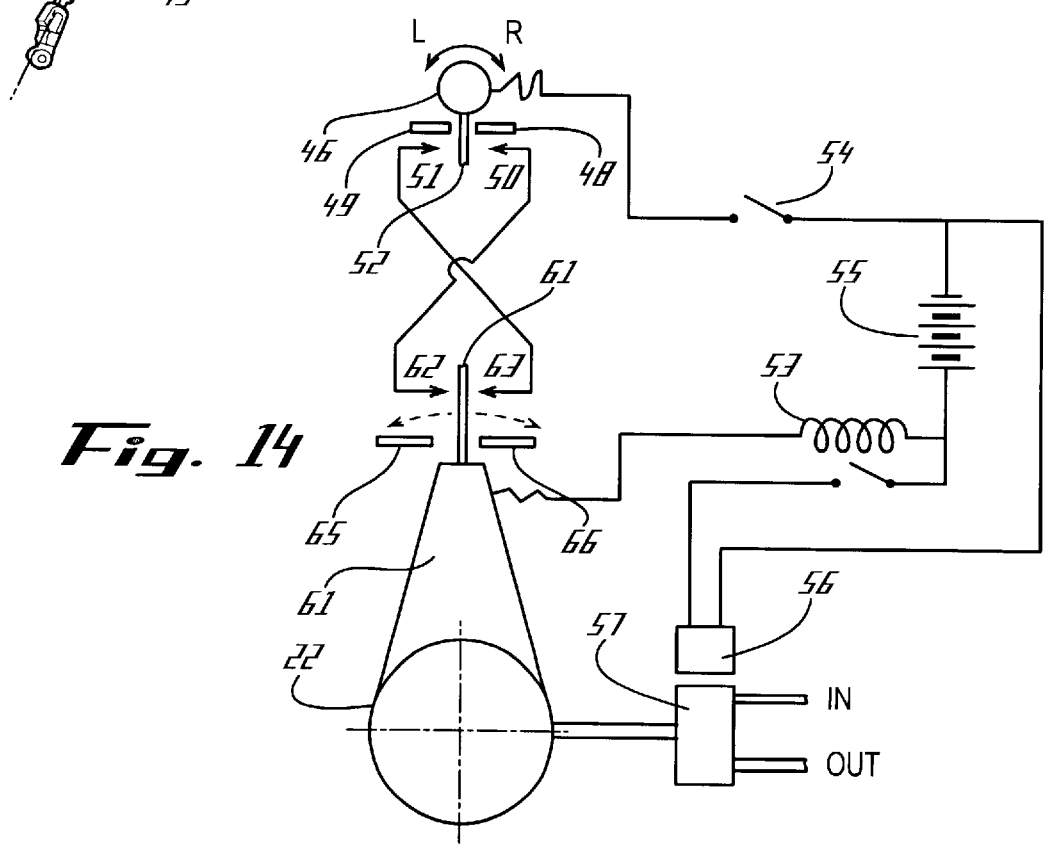
Fig. 14

ANTI-JACKKNIFE TRAILER COUPLING

BACKGROUND OF THE INVENTION

1. Field of the Invention

The present invention generally relates to truck rigs composed of semi-tractors and trailers. More specifically, it pertains to a coupling apparatus that can couple the semi to the trailer, which coupling apparatus deters jackknifing on wet and icy roads, or even when the tractor-trailer is involved in an accident with another vehicle.

2. Description of Related Art

When parking the standard tractor-trailer in a yard or at a loading dock, support legs at the front end of the trailer are let down to the ground to support the weight of the trailer, and the coupling is unlatched, freeing the trailer from the semi. The semi can then be driven away. To rehitch the trailer, the semi is backed under the front of the trailer, coupled up, and the support legs raised. The tractor-trailer rig is then ready to go.

The conventional coupling is a rather simple device, being a pin on the trailer capable of fitting in a socket on the back of the semi. However, it can be complicated some by the need to bring the pin into the socket when coupling up. As the semi backs up, the pin on the trailer enters a tapered, wide-mouthed slot in a hinged support plate on the back of the semi, and the pin then guided into a socket opening. The socket plate is sloping, so that as the semi backs up, it raises the trailer support legs clear of the ground, and when the pivot pin is in its socket, it is locked in place.

Such a coupling has several disadvantages. Every day, many trailer-rigs jackknife, injuring or killing the driver, destroying the trailer and backing up traffic for miles. These wrecks typically involve automobiles, cause lost time for commuters and other trucks, and sometimes back up the traffic for hours. There is an urgent need for an improved anti-jackknife coupling for the high-speed trailer rigs driven on our expressways today, and as the roads become more crowded, the need will become greater.

Optimal points at which the semi should support the trailer are over the center point between the rear tandem wheels, or sometimes a point over the forward wheels. These points preferably lie over the axles of the rear or front wheels. These places are ideal for supporting the load, but such pivot points located over and in line with the wheels greatly increase the danger of jackknifing.

A support point located midway between the front and rear axles is the best pivot point to deter jackknifing, but in practice the pivot point cannot be so located as this would put one-half of the trailer coupling load on the front wheels, and overload them. Further, since this point is under the semi cab, it would make coupling and uncoupling difficult. Even if it were possible to place the support point at the ideal spot to deter jackknifing, midway between the axles, it would not eliminate the incidents of jackknifing. In a scenario where the back wheels of the semi are on ice and the front wheels are on dry pavement, or vice versa, the resisting torque would be unbalanced and the semi and trailer would still jackknife if it were to slide. Some drivers, fearful of jackknifing, loosen the brakes of the semi so that the trailer is a drag under all braking conditions. Yet, this does not reduce the danger of jackknifing, and actually greatly increases the danger of wrecks due to increased stopping distance.

It is apparent that it would be beneficial to provide a coupling apparatus that incorporates a braking assembly that can produce a resisting torque much greater than that of the icy road, and therefore prevent jackknifing. Thus its can be seen that there is need for an anti-jackknife trailer coupling device that can prevent trucks from jackknifing. It is to the provision of such a device that the present invention is primarily directed.

BRIEF SUMMARY OF THE INVENTION

Briefly described, in a preferred form, the present coupling device comprises a socket plate, a pivot, a locking assembly, a brake assembly and automated control systems. The socket plate is hingedly attached to the semi via the pivot fixed to a socket frame of the semi. The locking assembly locks the trailer to the semi, and the brake assembly limits relative rotational movement between the trailer and semi. The braking assembly is actuated by the automated control systems.

Under ordinary driving conditions, there will be minimal to no difference in the performance of trailer rigs using the present coupling device of the present invention over that of the standard trailer coupling. The semi and trailer are coupled in a standard way, maneuvered around the yard and backed up to the loading dock in a same way as with a conventional coupling, and can be driven cross-country in the conventional manner.

A primary difference between the present coupling device and those of the prior art is in how the two types of couplings act on roads experiencing inclement weather, for example, wet and ice covered roads. A semi equipped with a conventional coupling that starts to slide might jackknife. However, a semi equipped with the present coupling device that starts to slide will not jackknife. As the semi starts to slip, the semi and the trailer lock together and move as one. This allows the driver to still function, and when the wheels take hold again, the driver will have full control of his rig.

The socket plate of the present device is designed such that it can receive conventional trailer pins through a central slot, and is initially inclined fore to aft. Underneath the front of the trailer are the two pins that slide in the central slot of the socket plate. When the pins are properly located and in place, the pins are about an equal distance fore and aft of the pivot for the socket plate. As the semi is backed under the trailer, the forward pin first enters the slot, and when the front of the trailer passes the pivot point, the slotted socket plate tips back to a level position. As the semi further backs under the trailer, the second pin then enters the slot. When the forward pin reaches the end of the slot, the pins are locked in place by the locking assembly.

The socket plate is mounted on the pivot to enable it to move not unlike a seesaw. The braking assembly incorporates a vertical shaft that allows the trailer to rotationally pivot relative to the semi. Also mounted on this shaft is a form of brake that when energized, can lock the semi to the trailer. The brake can be in the form of a drum brake 15 or a disk type brake 67, or a rotor hydraulic cylinder 68, an electromagnetic brake 69, or even a jaw clutch 70 may be used and is contemplated.

The automated control systems include brake toggles or calipers, a switch holder and switches that make or break the electric circuit that operates the brake. There are similar switches on the steering column or steering drag rod of the semi that open and close as the wheels are turned. The switches on the vertical shaft of the brake assembly are connected in series with switches on the steering column so as to activate the brake if the semi turns opposite to the way the wheels are turned.

A preferred method to deter jackknifing provides that if the steering wheel is turned a slight amount to the right, a switch is closed. This switch is in series with another switch at the brake of the brake assembly, which closes if the semi turns to the left. If both switches are closed at the same time, the brake is energized and the semi and trailer are locked together. It will be understood that the same thing happens if the wheel is turned to the left, and the right switch at the coupling is closed. This means that if the steering wheel is turned one way and the semi is skidding the other way, the brake locks the semi to the trailer, and although the semi and trailer may skid to a stop, the semi cannot jackknife relative the trailer.

Generally, if the semi begins to slip and turn either way about the vertical shaft, the front wheels must be turned in the opposite direction to activate the brake. Under normal operating conditions, the trailer always turns in the direction of the front wheels of the semi, and the coupling brake is thus not energized.

If there is a need for the semi to be equipped so as to be able to carry either the standard trailer or the anti-jackknife trailer, a different type of socket plate is provided. In such a situation, the socket plate has arms on each side that extend outwardly on a line crosswise of the centerline. The slots for the pins are on opposite sides of the centerline to engage the crosswise located pins on the trailer. When the pins are locked in place, the socket plate and brake turn as the trailer turns. A third socket slot may then be placed at the center of the socket plate to allow the semi to haul either the standard trailer with just one center pin, or anti-jackknife trailer with the two outside pins. If all trailers come equipped with two pins, the center slot may be eliminated.

These objects and other objects, features and advantages of the present invention will become more apparent upon reading the following specification in conjunction with the accompanying drawing figures.

BRIEF DESCRIPTION OF THE FIGURES

FIG. 12 is a cutaway view of the steering column, showing the preferred location of the wheel directon switches, section 13-13.

FIG. 13 is a section through the steering column switch box.

FIG. 14 is a schematic diagram showing the preferred electrical and hydraulic hook-up to operate the brake.

DETAILED DESCRIPTION OF PREFERRED EMBODIMENTS

Figure 1:
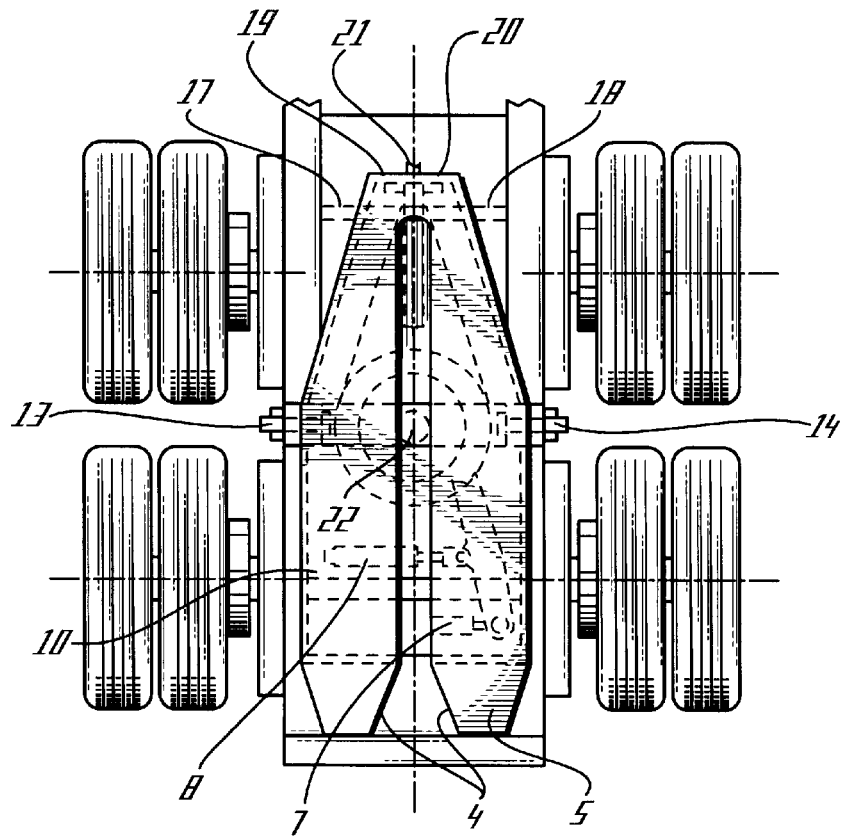
FIG. 1 is a plan view of the semi showing the hinged socket plate with the slot lengthwise of the plate.
Figure 2:
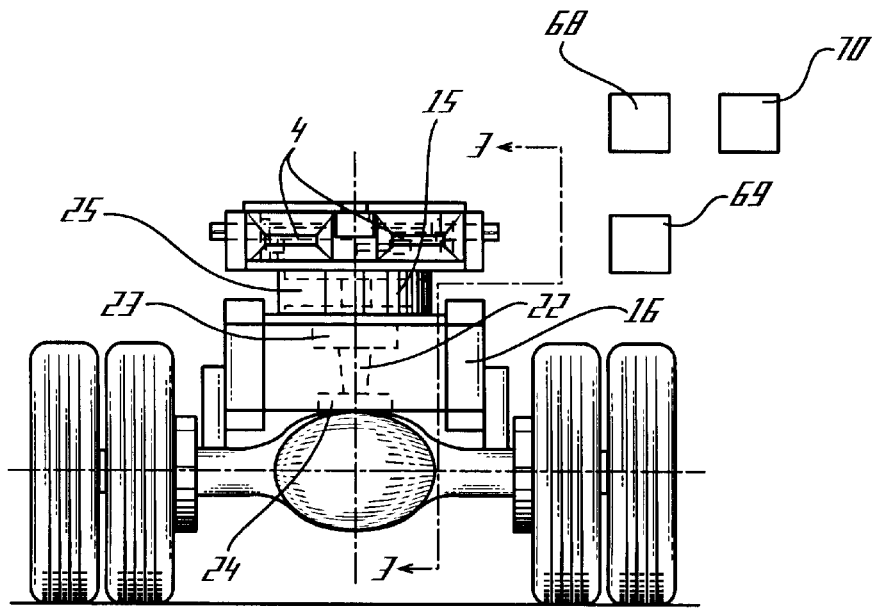
FIG. 2 is a rear elevation of the semi and coupling.
Figure 3:
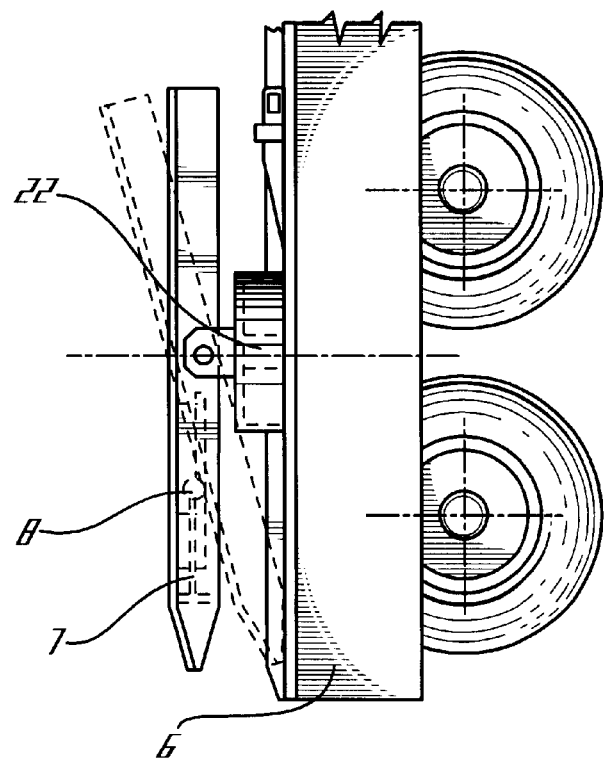
FIG. 3 is the side elevation of the semi and coupling.
Figure 4:
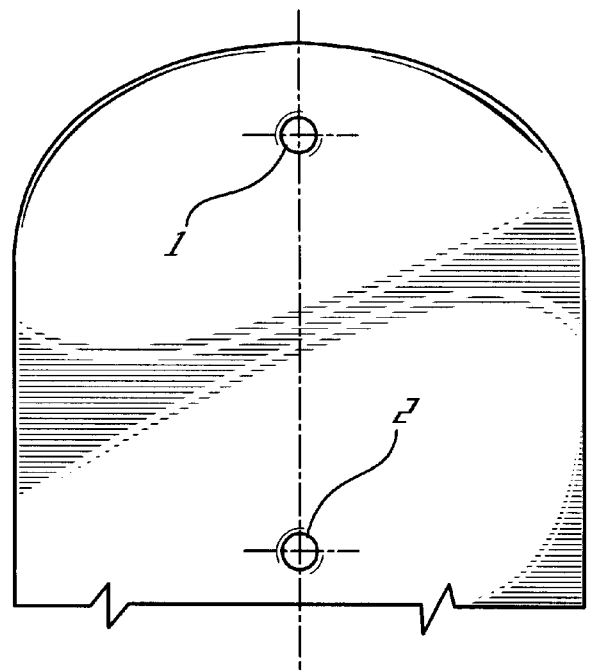
FIG. 4 is a plan view of the trailer, where the lengthwise located pins under the trailer are shown dotted.
Figure 5:
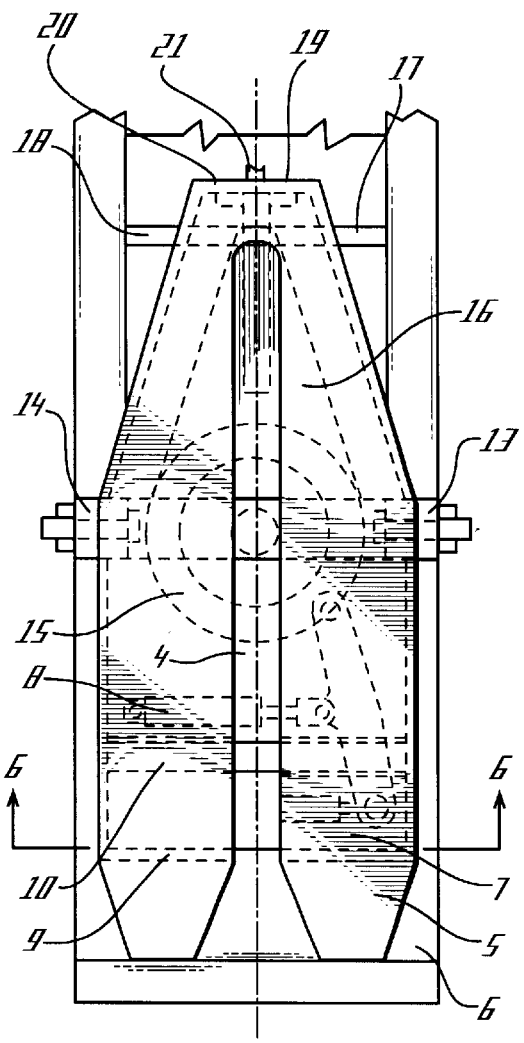
FIG. 5 is a plan view of the rear of the semi showing the hinged support plate with three pin slots.
Figure 7:
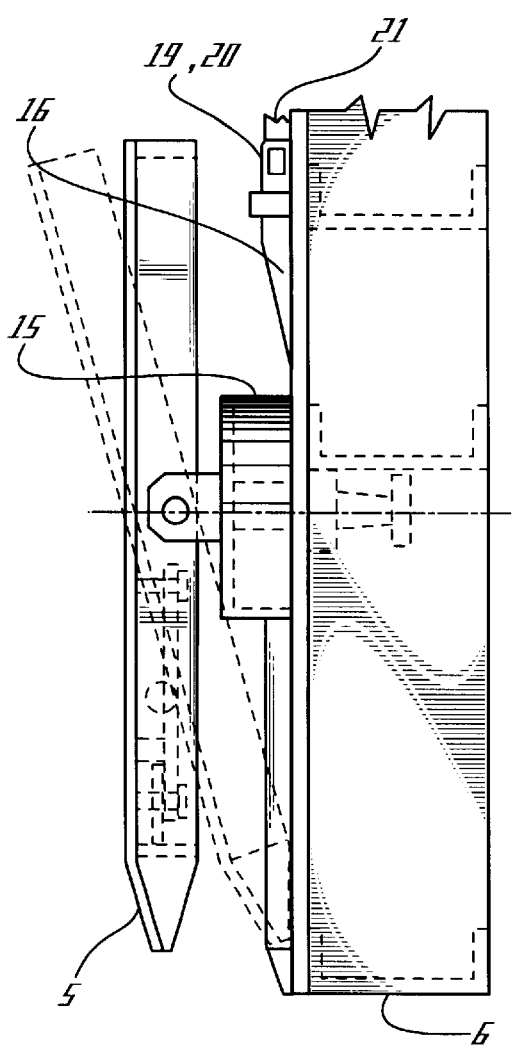
FIG. 7 the side elevation of FIG. 6-6.
Figure 6:
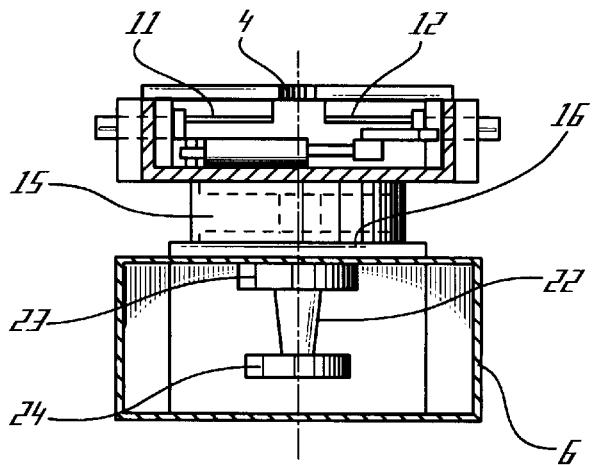
FIG. 6 is a sectional view of the rear elevation of FIG. 5.
Figure 8:
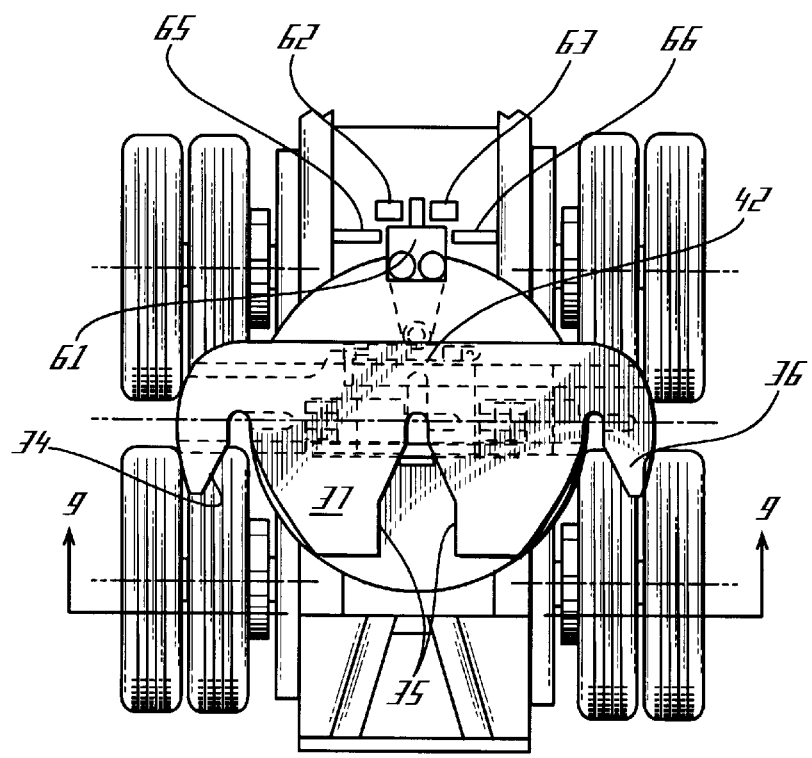
FIG. 8 is a plan view of the semi showing the hinged socket plate with the slot crosswise of the semi.
Figure 9:
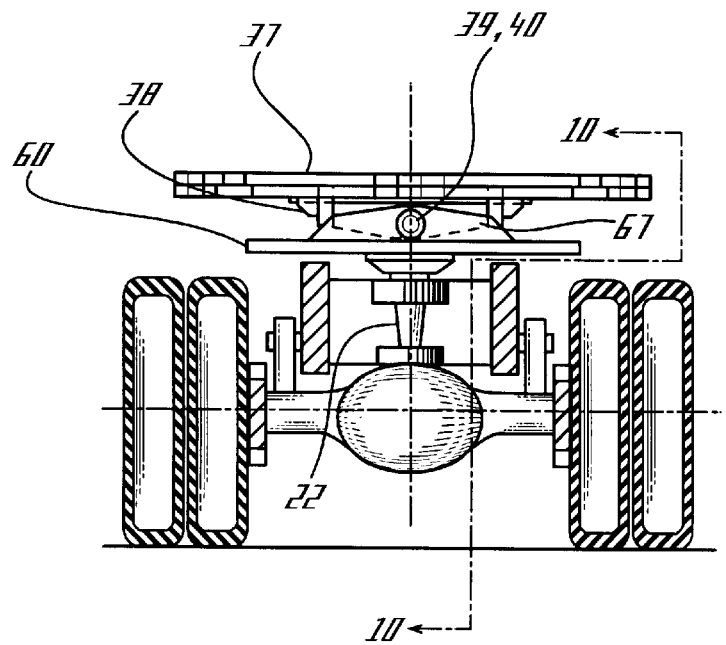
FIG. 9 is a sectional view of the rear elevation of the semi and coupling.
Figure 10:
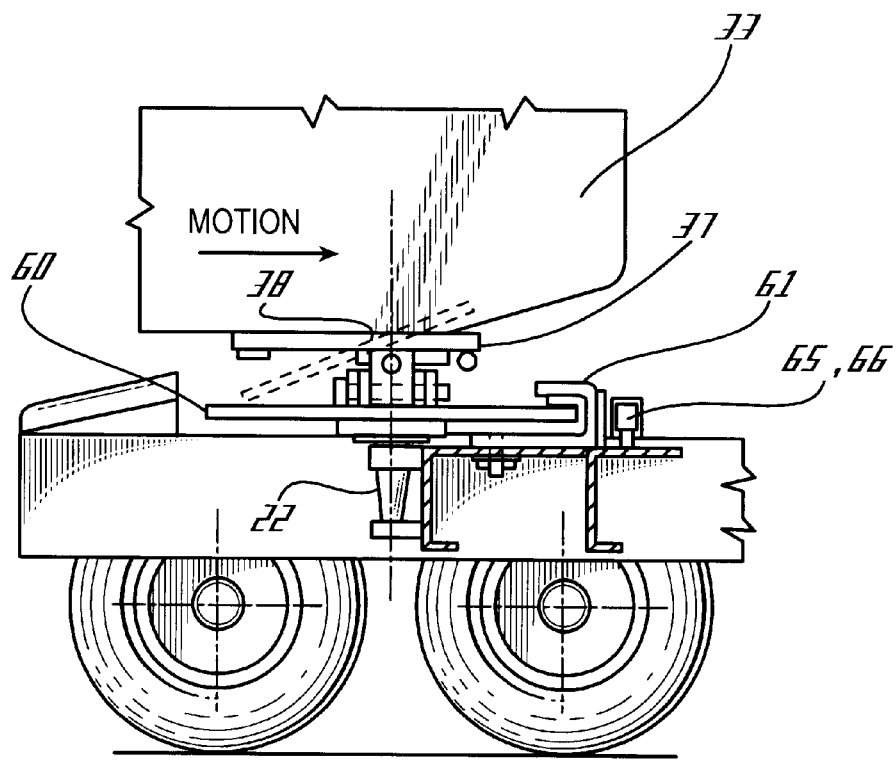
FIG. 10 is the sectional view of the side elevation of the semi and coupling.
Figure 11:
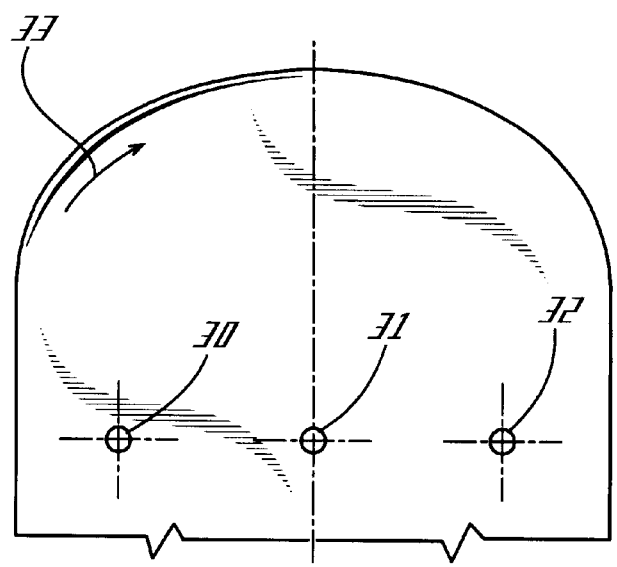
FIG. 11 is a plan view of the trailer, where the crosswise located pins under the trailer are shown dotted.

Referring now in detail to the drawing figures, wherein like reference numerals represent like parts throughout the several views, FIGS. 1–3 show the assembly of the preferred coupling device on a semi, and FIGS. 5–7 are enlarged views of the coupling device itself. The present coupling device comprises a socket plate, a pivot, a locking assembly, a brake assembly and automated control systems.

A socket frame 6 of the semi provides a mount for the socket plate 5 having a lengthwise slot 4 that can accommodate the locking pins 1, 2 of a trailer 3. The slot 4 can have a V-shaped entrance to guide the trailer pins 1, 2 into the slot 4.

A pivot of the present coupling device enables the socket plate 5 to adjust during coupling and uncoupling. The pivot comprised of hinge members 13, 14 allow the socket plate 5 to rock like a see-saw.

A locking assembly is provided to lock the trailer to the semi upon coupling. The locking assembly includes a locking bar 7 that is capable of sliding to lock the trailer pins 1, 2 firmly to the socket plate 5. The locking bar 7 can be moved manually or by the provision of a cylinder 8. The locking bar 7 can slide on locking guides 9, 10 and are closed on the lower side by backup plates 11, 12. The locking bar 7 is shown for the rear pin 2 only, but it may be extended to lock both pins 1, 2.

The present coupling device further comprises a braking assembly to deter the incidents of jackknifing. The brake assembly includes brake drum assembly 15 that can turn as the socket plate 5 turns. A brake plate 16 supports the brake bands inside the drum 15 and can move a short distance between braking stops 17, 18. As the brake plate 16, a switching assembly is activated wherein a tab 21 opens and closes switches 19, 20.

The brake assembly further includes a pivot shaft 22. The socket plate 5 and the drum assembly 15 are fastened to the pivot shaft 22, which turns in bearings 23, 24.

If the present coupling device is utilized on a semi that may haul either a conventional trailer or an anti-jackknife trailer, a second embodiment of the present coupling device is provided and illustrated in FIGS. 8–11. A socket plate 37 is used that enables three pins 30–32 of the trailer to slide into three crosswise slots 34–36 of the socket plate 37. In such an embodiment, the locking bar 41 slides in to lock the three trailer pins 30-32 firmly to the socket plate 37, and can be moved by a cylinder 42. To limit undue forces on the socket plate 37, preferably it is hinged both crosswise on pin 38 and lengthwise on pins 39, 40.

Alternative designs of the elements of the present coupling device are contemplated. For example, FIGS. 8–11 illustrate the use of a disk type of brake 67 instead of a the drum brake 15. A caliper 61 is allowed to move a slight amount between brake stops 65, 66 to operate switches 62, 63.

Further, FIG. 12 is a cutaway elevation view of a steering column 44 and switch box 45 of a semi outfitted with the present coupling device. Section 13-13 is a section cut through the switch box 45, showing a friction sleeve 46 that is fastened around the steering column 44. The sleeve 46 has a friction surface 47 providing enough drag to turn with column 44 whichever way it might turn. The movement of a dog 52 of the sleeve 46 is limited by stops 48, 49, but the dog 52 can still move far enough each way to close the switches 50, 51.

FIG. 14 is schematic diagram of the preferred automated systems of the present coupling device, comprising electrical and hydraulic subsystems that can operate the antijackknife coupling of the present invention. The automated systems make use of the steering switches and the coupling switches, which are cross-coupled, in series with a power switch 54, time delay 53, battery 55, and solenoid 56 of valve 57.

The automated systems preferably operate as follows. Assume that the trailer rig is moving down the road. The automated systems are turned on and the driver turns the steering wheel to the right. The dog 52 on the steering column 44 closes the switch 51, and the semi turns to the right, in turn closing switch 20 on the brake shoe plate. The two switches 51, 20 are not in series, so the circuit operating the brake is not energized. The opposite two switches are closed when the steering wheel is turned to the left and the semi turns left, and the coupling brake is still not energized. If the conditions are normal, the semi always turns in the direction the front wheels are turned.

However, if the road is slick and the semi starts to slide in a direction opposite to the way the front wheels are turned, the two closed switches are in series and the brake is energized. This locks the semi to the trailer and they slide as a unit. The semi and trailer remain in line, and the driver has control as soon as the slick spot is passed. To release the brake, the driver need only turn the wheels in the direction the semi is moving.

If the shoe plate dog 21 is holding the switch 20 closed, and the steering wheel is turned in the opposite direction, it is possible that the brake might momentarily be applied before the semi can move. To avoid this situation, the electrical delay is set to allow sufficient time for the switch to open before the brake acts. However, even without the delay, the brake can never block the switches, since there is always enough movement to turn them on and off even when the coupling is locked.

Under normal conditions, the brake band 13 is set to drag on the drum with sufficient force to move the band plate and operate the switches.

Other locking arrangements, including rotary hydraulic cylinders, magnetic clutches, and even jaw clutches may be used without changing the scope and intent of this patent.

A simple "on and off" switch on the truck panel would give the driver instant control over the anti-jackknifing equipment.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. Anti-jackknife system for a tractor trailer, the tractor having a steering wheel, the trailer having engagement pins, said anti-jackknifing system comprising:
    (a) a socket plate mounted on the tractor via a rotatable shaft, said socket plate capable of engaging the engagement pins of the trailer;
    (b) a brake assembly capable of braking the rotatable shaft and inhibiting pivoting action between the tractor and trailer; and
    (c) an automated control system capable of activating said brake assembly in response to a difference in directions between the trailer and the tractor wheels, upon such difference, the trailer is rigidly connected to the trailer, wherein said automated control system incorporates a steering switch and a coupling switch, that are cross-coupled in series such that when the trailer moves in a direction other than the way the tractor wheels are turned, the steering switch and the coupling switch trigger thereby rigidly connecting the tractor to the trailer;
    said anti-jackknife system capable of flexibly connecting the tractor to the trailer under ordinary driving conditions, and said system capable of rigidly connecting the tractor to the trailer upon the beginning of a jackknife situation.

2. The anti-jackknife system of claim 1 further comprising a locking assembly capable of securing the engagement of the engagement pins to the socket plate.

3. The anti-jackknife system of claim 1, said brake assembly comprising a disk and caliper friction brake.

4. The anti-jackknife system of claim 1, said brake assembly comprising a rotary hydraulic cylinder brake.

5. The anti-jackknife system of claim 1, said brake assembly comprising an electro-magnetic brake.

6. The anti-jackknife system of claim 1, said brake assembly comprising a jaw clutch.

7. Anti-jackknife system for a tractor trailer, the trailer having engagement pins, said anti-jackknifing system comprising:
    (a) a socket plate mounted on the tractor via a rotatable shaft, said socket plate capable of engaging the engagement pins of the trailer, the rotatable shaft enabling pivoting action between the tractor and trailer, said socket plate having a slot capable of receiving the engagement pins;
    (b) a brake assembly capable of braking the rotatable shaft and inhibiting pivoting action between the tractor and trailer; and
    (c) an automated control system capable of activating said brake assembly, wherein said automated control system incorporates a steering switch and a coupling switch, that are cross-coupled in series such that when the trailer moves in a direction other than the way the tractor wheels are turned, the steering switch and the coupling switch trigger thereby rigidly connecting the tractor to the trailer;
    said anti-jackknife system capable of flexibly connecting the tractor to the trailer under ordinary driving conditions, and said system capable of rigidly connecting the tractor to the trailer upon the beginning of a jackknife situation.

8. The antijackknife system of claim 7 further comprising a locking assembly capable of securing the engagement of the engagement pins to the socket plate.

9. Anti-jackknife system for a tractor trailer, the trailer having engagement pins, said anti-jackknifing system comprising:
    (a) a socket plate mounted on the tractor via a rotatable shaft, said socket plate capable of engaging the engagement pins of the trailer, the rotatable shaft enabling pivoting action between the tractor and trailer, said socket plate having three slots capable of receiving the engagement pins;
    (b) a brake assembly capable of braking the rotatable shaft and inhibiting pivoting action between the tractor and trailer; and
    (c) an automated control system capable of activating said brake assembly;
    said anti-jackknife system capable of flexibly connecting the tractor to the trailer under ordinary driving conditions, and said system capable of rigidly connecting the tractor to the trailer upon the beginning of a jackknife situation.

10. The anti-jackknifing system of claim 9, said automated control system activating said brake assembly to brake the rotational shaft when the trailer moves in a direction other than the way the tractor wheels are turned.

11. The anti-jackknifing system of claim 9, further comprising a locking assembly capable of securing the engagement of the engagement pins to the socket plate.

12. The anti-jackknifing system of claim 9, said brake system comprising a disk and caliper friction brake.

13. The anti-jackknifing system of claim 9, said brake system comprising a rotary hydraulic cylinder brake.

14. The anti-jackknifing system of claim 9, said brake system comprising an electro-magnetic brake.

15. The anti-jackknifing system of claim 9, said brake system comprising a jaw clutch.

16. The anti-jackknife system of claim 9, wherein said automated control system comprises steering switches and coupling switches which are cross-coupled in series such that when the trailer moves in a direction other than the way the tractor wheels are turned, a steering switch and a coupling switch are triggered in series causing a circuit operating said brake to activate thereby rigidly connecting the tractor to the trailer.

* * * * *